(12) United States Patent
Smires et al.

(10) Patent No.: US 8,478,648 B2
(45) Date of Patent: Jul. 2, 2013

(54) APPARATUS AND METHOD FOR AUTOMATED INVENTORY TRACKING AND AUTHENTICATION

(75) Inventors: Daniel T. Smires, Freehold, NJ (US); Mary Grikas, Colts Neck, NJ (US); Jyotsna Kachroo, Millburn, NJ (US)

(73) Assignee: Vonage Network LLC, Holmdel, NJ (US)

( * ) Notice: Subject to any disclaimer, the term of this patent is extended or adjusted under 35 U.S.C. 154(b) by 1303 days.

(21) Appl. No.: 11/606,289

(22) Filed: Nov. 30, 2006

(65) Prior Publication Data

US 2008/0129451 A1 Jun. 5, 2008

(51) Int. Cl.
| | |
|---|---|
| G06G 1/14 | (2006.01) |
| G06Q 20/00 | (2012.01) |
| G06Q 10/00 | (2012.01) |
| G06F 17/00 | (2006.01) |
| G06K 7/10 | (2006.01) |
| G06Q 20/20 | (2012.01) |
| G06Q 30/02 | (2012.01) |
| G06K 7/14 | (2006.01) |

(52) U.S. Cl.
CPC ............. *G06Q 20/203* (2013.01); *G06Q 30/02* (2013.01); *G06K 7/14* (2013.01)
USPC .......... 705/22; 705/28; 235/375; 235/462.01; 235/462.14

(58) Field of Classification Search
CPC ..... G06Q 20/203; G06Q 10/087; G06Q 30/02; G06K 7/10861; G06K 7/10851
USPC ......... 705/8, 22, 28; 340/10.1, 10.5; 379/37, 379/42, 45; 370/395.54; 235/462.14, 375, 235/462.01
See application file for complete search history.

(56) References Cited

U.S. PATENT DOCUMENTS

| | | | |
|---|---|---|---|
| 5,434,775 A | 7/1995 | Sims et al. | |
| 6,317,028 B1 * | 11/2001 | Valiulis | 340/10.1 |
| 6,324,522 B2 | 11/2001 | Peterson et al. | |
| 6,715,682 B2 * | 4/2004 | Hara | 235/462.14 |
| 6,901,381 B2 | 5/2005 | Brown et al. | |
| 7,027,564 B2 * | 4/2006 | James | 379/37 |
| 2006/0180661 A1 * | 8/2006 | Grant et al. | 235/382 |
| 2007/0121803 A1 * | 5/2007 | Koepke et al. | 379/37 |
| 2007/0133567 A1 * | 6/2007 | West et al. | 370/395.54 |
| 2007/0215685 A1 * | 9/2007 | Self et al. | 235/375 |
| 2007/0248077 A1 * | 10/2007 | Mahle et al. | 370/352 |
| 2008/0098459 A1 * | 4/2008 | Banga et al. | 726/3 |
| 2008/0129451 A1 * | 6/2008 | Smires et al. | 340/5.92 |

* cited by examiner

*Primary Examiner* — Olusegun Goyea
(74) *Attorney, Agent, or Firm* — Nixon & Vanderhye P.C.; Joseph Pagnotta

(57) ABSTRACT

Method and apparatus for automated inventory tracking and authentication using device identity-containing information associated with at least one device that is part of an inventory. The method includes accepting initial device identity-containing information from an inventory origination point to a first sales distribution point and accepting additional device identity-containing inventory from each instance of a new and successive sales distribution point as inventory moves through a supply chain. This information is stored and then later compared to a device ID of the at least one device. An authentication action is performed upon the at least one device based upon said accepted initial and additional information. The device identity-containing information includes MAC address information, device serial number information.

25 Claims, 5 Drawing Sheets

APPARATUS AND METHOD FOR AUTOMATED INVENTORY TRACKING AND AUTHENTICATION

FIELD OF THE INVENTION

The invention is related to the fields of inventory management and telecommunication devices and services and more specifically, the invention is directed to an apparatus and method for tracking inventory of telecommunications components and authenticating same prior to connection to a telecommunications service.

BACKGROUND OF THE INVENTION

Voice over IP (VoIP) is a recent technological development in the field of telecommunications that is utilized to transmit voice over a broadband data network using the Internet Protocol (IP) rather than the existing Public Switched Telephone Network (PSTN) or Plain Old Telephone Service (POTS). Internet Protocol is a part of the Transmission Control Protocol/Internet Protocol (TCP/IP) family of protocols described in software that tracks the Internet address of nodes, routes outgoing messages, and recognizes incoming messages. Such a data network may be the Internet or a corporate intranet, or any other TCP/IP network. Subscribers (either businesses or individuals) use VoIP by purchasing and installing the necessary equipment to access a VoIP service provider at their broadband-equipped location. Such VoIP equipment would include, in one example, an adapter connected between the subscriber's PSTN phone and a broadband connection point (i.e., cable modem).

The aforementioned VoIP equipment is available from a few different sources including shipment (via a third party supplier) from a VoIP service provider such as Vonage of Holmdel, New Jersey or direct purchase from a retail establishment specializing in consumer electronics and telecommunications devices. Since the supply chain for such VoIP equipment varies, it is possible that such equipment may be lost, stolen or otherwise inappropriately distributed to a potential subscriber. If such "inappropriate" equipment were subsequently connected to a broadband connection and/or "hacked" to appear as legitimately obtained equipment, there is a potential for lost revenue due to the lack of sale of the VoIP equipment as well as the subsequent use of same in a subscriber-based business model.

Therefore, there is a need in the art for an apparatus and method that provides for controlled access to an inventory control system (ICS) that mitigates the aforementioned problems of inventory theft and loss of services.

SUMMARY OF THE INVENTION

The present invention generally relates to a method and apparatus for automated inventory tracking and device authentication using device identity-containing information associated with at least one device that is part of an inventory. In one embodiment of the invention, the method includes accepting initial device identity-containing information from an inventory origination point to a first sales distribution point and accepting additional device identity-containing inventory from each instance of a new and successive sales distribution point as inventory moves through a supply chain. This information is stored and then later compared to a device ID of the at least one device. In this way, an authentication action is performed upon the at least one device based upon said accepted initial and additional information. In one embodiment of the invention, the device identity-containing information includes MAC address information, device serial number information.

Authentication includes successfully registering the device to access a service (such as a telecommunications service and most preferably a VoIP service). Alternately, authentication includes confirming that the device is at a proper location in the supply chain (such action preferably performed by an inventory control manager). Authentication is not performed if the device is found to be stolen, tampered or otherwise improperly obtained or used. Authentication is performed if the device ID associated with the at least one device matches device identity-containing information provided through the supply chain movement.

In one embodiment of the invention, accepting of the initial and additional device identity-containing information occurs after delivery of the inventory from the origination point and each instance of the new and successive sales distribution point respectively. Regardless of which point, the accepting of said initial device identity-containing information occurs within 24 hours after delivery of the inventory.

In another embodiment of the invention, a system for tracking inventory and performing device authentication using device identity-containing information associated with at least one device that is part of an inventory is provided. The system includes means for accepting initial device identity-containing information from an inventory origination point to a first sales distribution point and additional device identity-containing inventory from each instance of a new and successive sales distribution point as inventory moves through a supply chain, means for storing said initial and additional device identity-containing information and means for authenticating said at least one device based upon said accepted initial and additional information.

BRIEF DESCRIPTION OF THE FIGURES

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

To achieve the desired objectives, the subject invention provides for an apparatus and method that provides for controlled access to an inventory control system (ICS). Such ICS is adapted to receive inventory information that allows for the authentication of individual members (or pieces) of the inventory as such pieces move through a supply chain starting at the piece manufacturer and ending at a retailer. Authentication of the inventory assures that the pieces moved properly through the supply chain and are available to provide the function(s) for which they were intended. Lack of authentication of a piece of inventory indicates that the piece may have been inappropriately handled (i.e., lost, stolen, improperly returned or the like) at some point in the supply chain and is no longer available to provide its intended function such as providing telecommunication services to a user.

Figure 1:
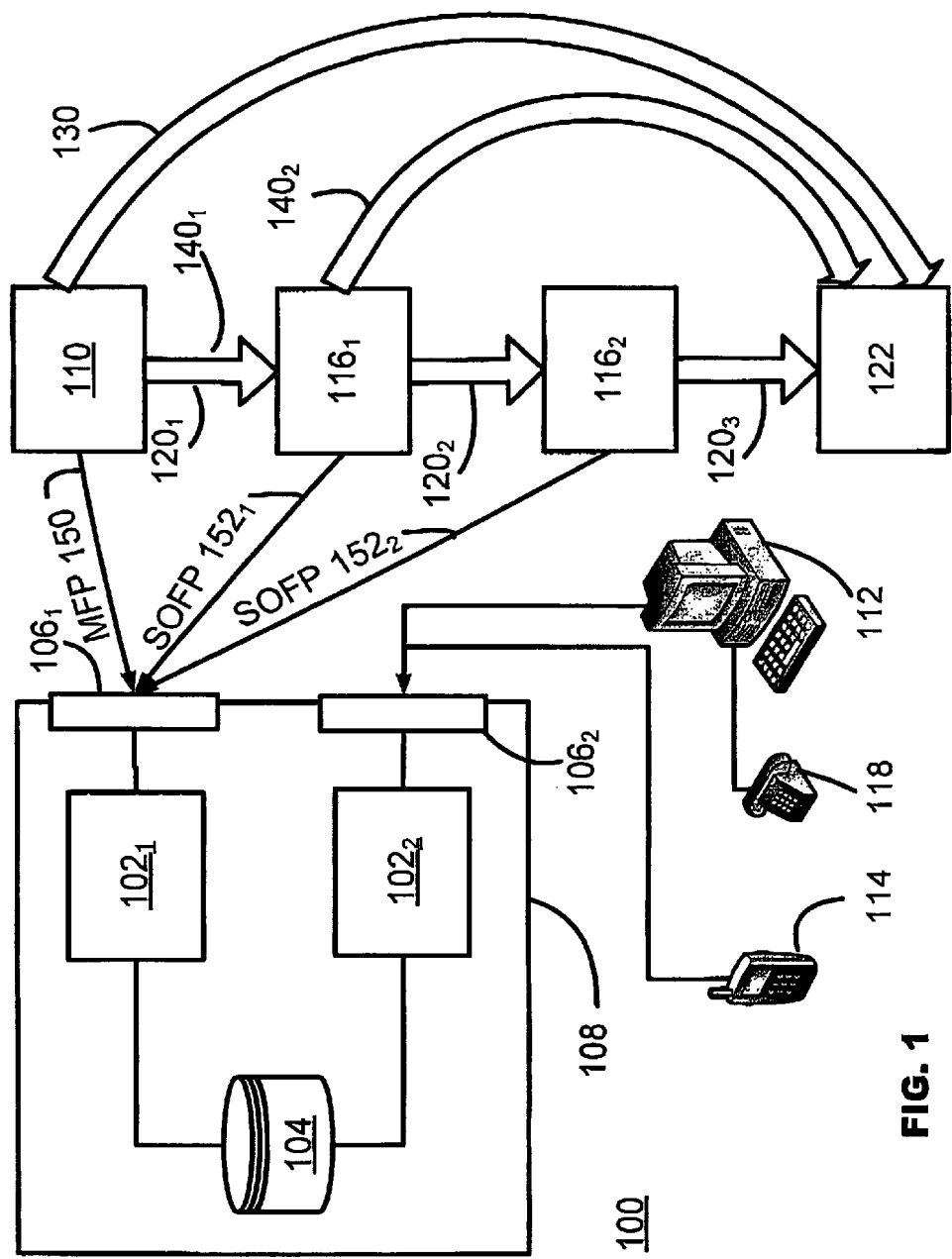
FIG. 1 depicts a block diagram of an inventory control system in accordance with the subject invention.

FIG. 1 depicts a system level block diagram of an inventory management environment 100 in which the subject invention may be practiced. Particularly, the inventory management environment 100 comprises an ICS 108, a plurality of inventory information locations (110 and 116), at least one point of sale location (e.g., retailer) 122, one or more inventory end users 112 and optionally one or more ICS managers 114. The ICS 108 accepts inventory management information (as explained in greater detail below) from the plurality of inventory information locations (110 and 116) as inventory moves through a supply chain. At some point in time, a piece of the inventory is sold (e.g., from a retailer 122) to a end user (i.e., consumer) 112. The end user 112 then accesses the ICS 108 (either directly or indirectly) as part of a procedure for registering and/or authenticating the inventory piece. Depending upon the inventory management information that the ICS 108 has accepted from the plurality of inventory information locations 110 and 116), the inventory piece may pass or fail the registration and/or authentication procedure.

In one embodiment of the invention, the ICS 108 further comprises a database 104, one or more servers 102 and one or more interfaces (106). Specifically, the database 104 organizes and holds the inventory management information that is received from the plurality of inventory information locations (110 and 116). The database may be any assembly, collection or construction of hardware and or software configured to accept data and such a database is well known in the art. The database 104 is connected to at least one ICS server 102 that is adapted to control input/output functions including queries to the database 104 and receiving and organizing inventory management information.

In one embodiment of the invention, depicted in FIG. 1, there are two ICS servers 102 each having a dedicated purpose. For example, in the depicted embodiment, a first ICS server 102, controls input/output functions of inventory management information from the plurality of inventory information locations (110 and 116) and a second ICS server 1022 controls input/output functions regarding registration/authentication of individual inventory members. The authentication procedure, in one embodiment of the invention, may be conducted by entities selected from the group consisting of one or more end users of inventory 112 and ICS manager(s) 114. In the depicted embodiment, each of the ICS servers 102 is connected to an interface 106 adapted to provide communication between the ICS 108 and the rest of the environment 100. Specifically in the depicted embodiment, a first interface $106_1$ provides communication between the first ICS server $102_1$ and the plurality of inventory information locations (110 and 116) and a second interface $106_2$ provides communication between the second ICS server $102_2$ and one or more end users of inventory 112 and/or ICS manager(s) 114. The interfaces 106 are any typical network-oriented interface that are capable of providing Internet-based communications to/from the ICS server(s) 102 and are known to those skilled in the art.

As presented earlier, the ICS 108 accepts inventory management information from the plurality of inventory information locations (110 and 116) as inventory moves through a supply chain. The following description provides an example of the flow of this information with regard to a telecommunication device 118 being the above-introduced inventory member or piece. Accordingly, this exemplary description is not intended to limit the scope of the subject invention, as the overall method and attendant apparatus for practicing the method are applicable to a variety of different inventory members where security, authentication or general desire to track inventory to prevent loss, theft or other undesirable business conditions will be known to those skilled in the art.

In detail, inventory management information is passed from the inventory information locations (110 and 116) to the ICS 108 via a plurality of inventory file paths (150, 152). Depending on the type of file and type of inventory information location, a particular file is created and passed along a particular file path. As such, information that indicates which inventory members (i.e., devices 118) are at which inventory information location (110, 116) or a point of sale location 122 is accurately and securely forwarded to the database 104 for updating. A first occurrence of inventory movement is identified by first inventory movement path 120. In this first occurrence, devices 118 are shipped from a device manufacturer 110 (or other similar point of origination) to a manufacturer's distributor $116_1$ along a first inventory movement first subpath $120_1$, then from the manufacturer's distributor $116_1$, to a regional distributor $116_2$ along a first inventory movement second subpath $120_2$ and finally from the regional distributor $116_2$ to a retail location 122 along a first inventory movement third subpath $120_3$.

After devices 118 have moved along a first inventory movement first subpath $120_1$, inventory management information in the form of a Manufacturer's Comma Separated Value File is sent along a manufacturer's file path (MFP) 150 to the ICS 108. More specifically, once the manufacturer 110 has shipped one or more devices 118, the Manufacturer's Comma Separated Value File is sent along a MFP 150 to the interface $106_1$. The interface $106_1$ then passes the file to the first server $102_1$ which then (after executing a security function such as a User ID and password matching process) passes the file to the database 104 where the inventory information contained therein is updated according to the data in the file. In one embodiment of the invention, the security function introduced above and subsequently referenced below is performed over a secure website access environment (i.e., using the https protocol). Preferably, all entities that are required to send inventory control information to the ICS 108 provide at least one IP address in order to access the ICS 108.

After devices 118 have moved along a first inventory movement second subpath $120_2$, inventory management information in the form of a Ship Out Comma Separated Value File is sent along a first ship out file path (SOFP) $152_1$ to the ICS 108. More specifically, once the manufacturer's distributor $116_1$ has shipped one or more devices 118, the Ship Out Comma Separated Value File is sent along the first SOFP $152_1$ to the interface $106_1$. The interface $106_1$ then passes the file to the first server $102_1$ which then (after executing a security function such as a User ID and password matching process) passes the file to the database 104 where the inventory information contained therein is updated according to the data in the file.

After devices 118 have moved along a first inventory movement third subpath $120_3$, inventory management information in the form of a Ship Out Comma Separated Value File is sent along a second SOFP $152_2$ to the ICS 108. More specifically, once the distributor $116_2$ has shipped one or more devices 118, the Ship Out Comma Separated Value File is sent along the second SOFP $152_2$ to the interface $106_1$. The interface $106_1$ then passes the file to the first server $102_1$ which then (after executing a security function such as a User ID and password matching process) passes the file to the database 104 where the inventory information contained therein is updated according to the data in the file.

A second occurrence of inventory movement is identified by a second inventory movement path 130. In this second occurrence, devices 118 are shipped from the device manufacturer 110 (or other similar point of origination) directly to the retailer 122. After devices 118 have moved along the second inventory movement path 130, inventory management information in the form of a Manufacturer's Comma Separated Value File is sent along the MFP 150 to the ICS 108. More specifically and similar to the description with respect to the first inventory movement path 120, once the manufacturer 110 has shipped one or more devices 118, the Manufacturer's Comma Separated Value File is sent along the MFP 150 to the interface $106_1$. The interface $106_1$ then passes the file to the first server $102_1$ which then (after executing a security function such as a User ID and password matching process) passes the file to the database 104 where the inventory information contained therein is updated according to the data in the file. In this scenario, no Ship Out Comma Separated Value Files are used.

A third occurrence of inventory movement is identified by third inventory movement path 140. In this third occurrence, devices 118 are shipped from a device manufacturer 110 (or other similar point of origination) to a manufacturer's distributor $161_1$ along a third inventory movement first subpath $140_1$ (which is identical to first inventory movement first subpath $120_1$), then from the manufacturer's distributor $116_1$ to a retailer 122 along a third inventory movement second subpath $140_2$.

After devices 118 have moved along the third inventory movement first subpath $140_1$, inventory management information in the form of a Manufacturer's Comma Separated Value File is sent along the MFP 150 to the ICS 108. More specifically, once the manufacturer 110 has shipped one or more devices 118, the Manufacturer's Comma Separated Value File is sent along the MFP 150 to the interface $106_1$. The interface $106_1$ then passes the file to the first server $102_1$ which then (after executing a security function such as a User ID and password matching process) passes the file to the database 104 where the inventory information contained therein is updated according to the data in the file.

After devices 118 have moved along the third inventory movement second subpath $140_2$, inventory management information in the form of a Ship Out Comma Separated Value File is sent along a first SOFP $152_1$ to the ICS 108. More specifically, once the manufacturer's distributor $116_1$ has shipped one or more devices 118, the Ship Out Comma Separated Value File is sent along the first SOFP $152_1$ to the interface $106_1$. The interface $106_1$ then passes the file to the first server $102_1$ which then (after executing a security function such as a User ID and password matching process) passes the file to the database 104 where the inventory information contained therein is updated according to the data in the file. In each occurrence of inventory movement described above, the point of sale location or retailer 122 does not send any inventory management information to the ICS 108 for the above-described purposes. Additionally and for sake of clarity, there can be only one Manufacturer's Comma Separated Value File entry for any given device 118 as it enters the supply chain. However, there can be multiple Ship Out Comma Separated Value File entries for any given device as such entries are generated every time a device moves along the supply chain after leaving the originating point.

According to the described inventory movement pathways, eventually all inventory members (i.e., devices 118) should arrive at a retailer 122 where they are subsequently purchased by an end user. The end user will then bring the device home, connect the device to a broadband access point and attempt to activate/register the device 118 (or a service associated therewith) by interacting with a web-based authentication process. The authentication process will compare information exclusive to and associated with the device 118 with information in the database 104. In making this comparison, the ICS 108 can make a determination as to whether the device has properly moved through the supply chain and it (or the service associated therewith) should be activated.

In one embodiment of this authentication process, the device 118 is connected to a consumers computer 112 and the computer 112 connects to the ICS 108 via the second interface $106_2$ (i.e, an authentication interface). The second interface $106_2$ provides communication between the second ICS server $102_2$ and one or more end users of inventory 112 and/or ICS manager(s) 114. The authentication process reads an identifier selected from the group consisting of a device serial number and a MAC address and compares same to the information in the database 104. If the information specific to the device 118 is valid (i.e., the information has been passed (via different files) through the complete supply chain), then the device or the service associated therewith is registered and activated. If the information specific to the device 118 is not valid (i.e., the information was not passed through the complete supply chain), then at some point, the device was improperly removed from the supply chain and it or the service associated therewith cannot be registered or activated.

In a second embodiment of the invention, one or more ICS manager(s) 114 access the ICS 108 via the second interface $106_2$. Specifically, if an ICS manager 114 wants to conduct inventory "spot checks" at various points in the supply chain or has a specific inquiry about a particular device 118, the ICS manager 114 can access the ICS 108 and run a manager's security process that is similar to the end user's device authentication process. For example, the ICS manager 114 can access the database 104 via an access point such as a computer terminal in the ICS 108 or a hand held wireless device capable of interfacing with the ICS 108 and key in a query with the information specific to the device in question. The results of the query are displayed for the ICS manager 114 to review and confirm if the device in question is at a proper location in the supply chain.

Figure 2:
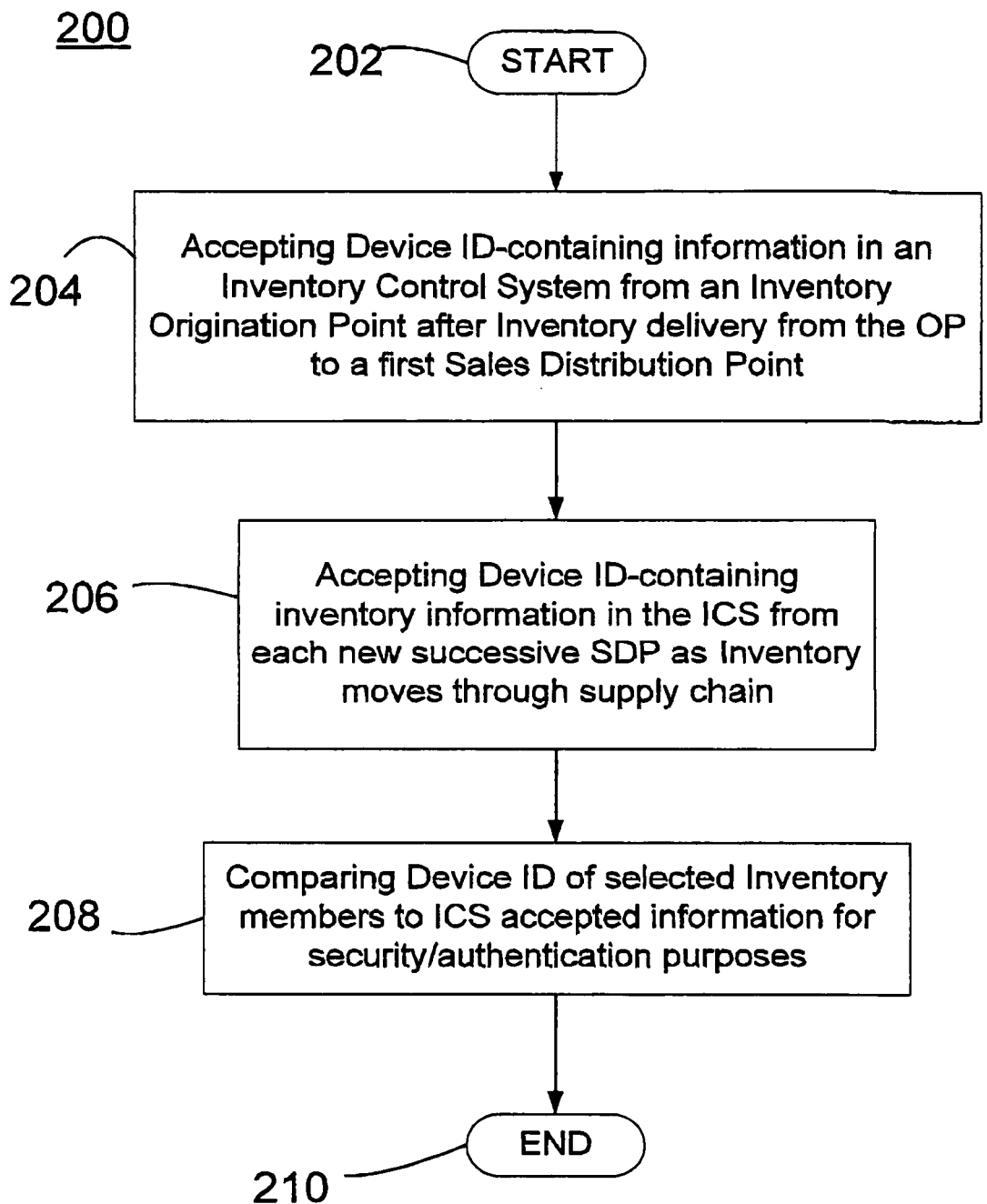
FIG. 2 depicts a series of method steps for practicing a first embodiment of an inventory control and device authentication operation in accordance with the subject invention.

FIG. 2 depicts a series of method steps 200 for practicing the inventory control (security) and device authentication operation in accordance with the subject invention as introduced above. Specifically, the method 200 starts at step 202 and proceeds to step 204 where device identity-containing inventory management information for use in an inventory control system is accepted from an inventory origination point to a first sales distribution point. The inventory origination point is, in one embodiment, a device manufacturer. The first sales distribution point is, in one embodiment, selected from the group consisting of a manufacturer's distributor, a regional distributor and a retail location. In one embodiment of the invention, the device identity-containing information is selected from the group consisting of a device serial number and a MAC address that is accepted into a database for storage and reference at a later time. Preferably, the information is accepted after delivery of the inventory from the inventory origination point to the first sales distribution point. Most preferably, the information is accepted within 24 hours after delivery of the inventory.

After step 204, the method proceeds to step 206 where device identity-containing inventory management information is accepted in the ICS from each new successive sales distribution point as inventory moves through a supply chain. That is, in some occurrences (such as the first and third occurrences presented above), inventory will move from the origination point to a retail location in more than one step. For each such intermediate step, inventory information is accepted in the ICS at each occurrence of the intermediate sales distribution point as inventory moves through a supply chain. In one embodiment, the intermediate sales distribution point is selected from the group consisting of a regional distributor and a retailer. Similar to the conditions under which step 204 is practiced, in one embodiment of the invention, the device identity-containing information is selected from the group consisting of a device serial number and a MAC address, that is accepted into a database for storage and reference at a later time. Preferably, the information is accepted after delivery of the inventory from the inventory origination point to the first sales distribution point. Most preferably, the information is accepted within 24 hours after delivery of the inventory.

After step 206, the method proceeds to step 208 where device identity-containing inventory information of at least one of the members of the inventory (i.e., devices 118) are compared to the accepted inventory management information. During the comparison, the device identity-containing information including, but not limited to the information presented above of the at least one inventory member is attemptedly matched up against the inventory management information that had been accepted (by the ICS 108) during previously forwarded inventory movements as described above. If the comparison reveals that the at least one inventory member has properly moved through the supply chain, then the inventory member is authenticated; if not, the inventory member is not authenticated. Examples of proper movement through the supply chain is selected from the group consisting of the inventory member moving completely from the manufacturer to a retail location and being registered by a end user and the inventory member moving partially through the supply chain from the manufacturer to an intermediate sales distribution point and being confirmed as by an inventory manager as being at a proper location in the supply chain. The method ends at step 210.

Figure 3:
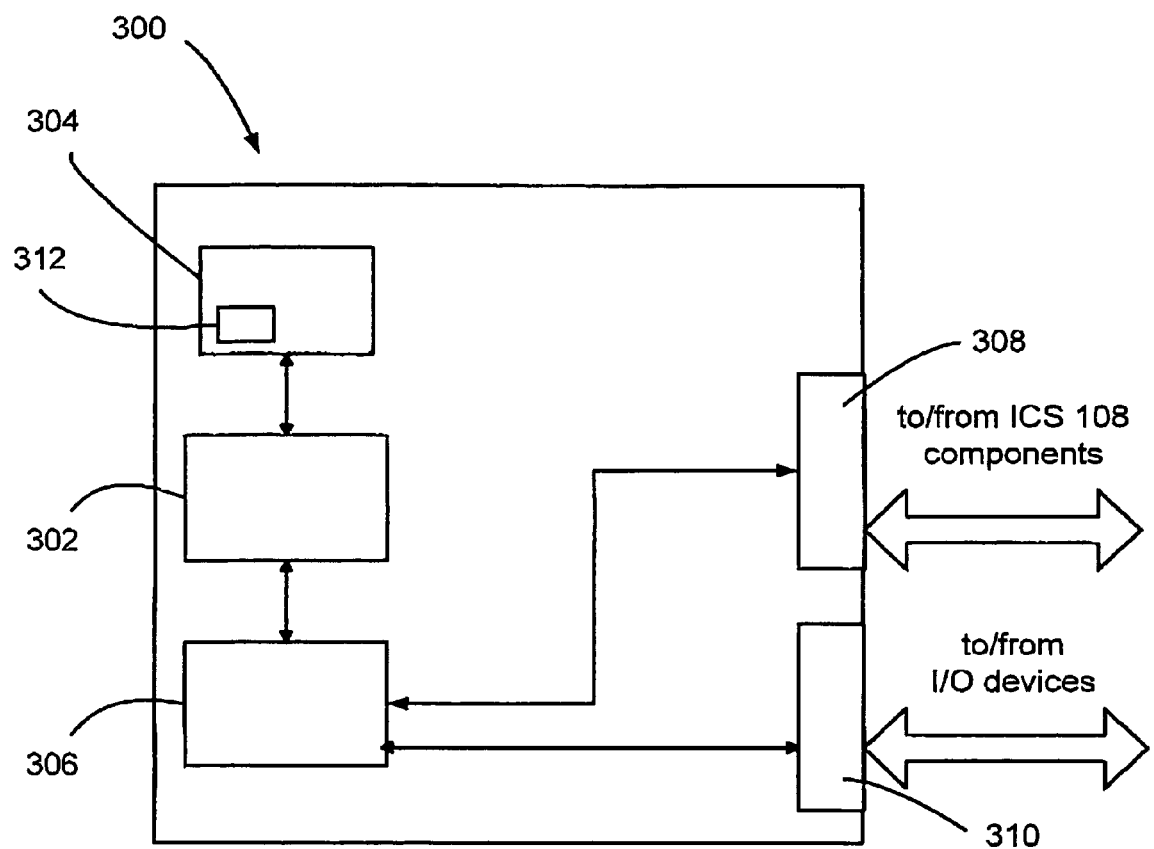
FIG. 3 depicts a schematic diagram of a controller that may be used to practice one or more embodiments of the present invention.

FIG. 3 depicts a schematic diagram of a controller 300 that may be used to practice the present invention. The controller 300 may be used to manage inventory and secure, register or otherwise authenticate inventory members or associated services as described above. The controller 300 may be one of any form of a general purpose computer processor used in accessing an IP-based network such as the Internet. The controller 300 comprises a central processing unit (CPU) 302, a memory 304, and support circuits 306 for the CPU 302 and provisions 308/310 for connecting the controller 300 to other ICS components and an IP-based network as described above and input/output devices related to the controller 300 respectively. The memory 304 is coupled to the CPU 302. The memory 304, or computer-readable medium, may be one or more of readily available memory such as random access memory (RAM), read only memory (ROM), floppy disk, hard disk, flash memory or any other form of digital storage, local or remote. The support circuits 306 are coupled to the CPU 302 for supporting the processor in a conventional manner. These circuits include cache, power supplies, clock circuits, input/output circuitry and subsystems, and the like. A software routine 312, when executed by the CPU 302, causes the controller 300 to perform processes of the present invention (such as but not limited to the method 200 described above) and is generally stored in the memory 304. The software routine 312 may also be stored and/or executed by a second CPU (not shown) that is remotely located from the hardware being controlled by the CPU 302. For example, the controller 300 may be part of either or both servers 102 of FIG. 1 or other ICS 108 component and the software routine 312 may be stored in a memory of part or both servers 102 of FIG. 1 or other ICS 108 component.

The software routine 312 is executed after delivery of the inventory from a point discussed above and such point attempts to accesses the ICS 108. The software routine 312, when executed by the CPU 302, transforms the general purpose computer into a specific purpose computer (controller) 300 that controls the automated inventory management process. As such, the process tracks and authenticates inventory as discussed above. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

The software routine 312 of the present invention is capable of being executed on computer operating systems including but not limited to Microsoft Windows 98, Microsoft Windows XP, Apple OS X and Linux. Similarly, the software routine 312 of the present invention is capable of being performed using CPU architectures including but not limited to Apple Power PC, Intel x86, Sun SPARC and Intel ARM.

Figure 4:
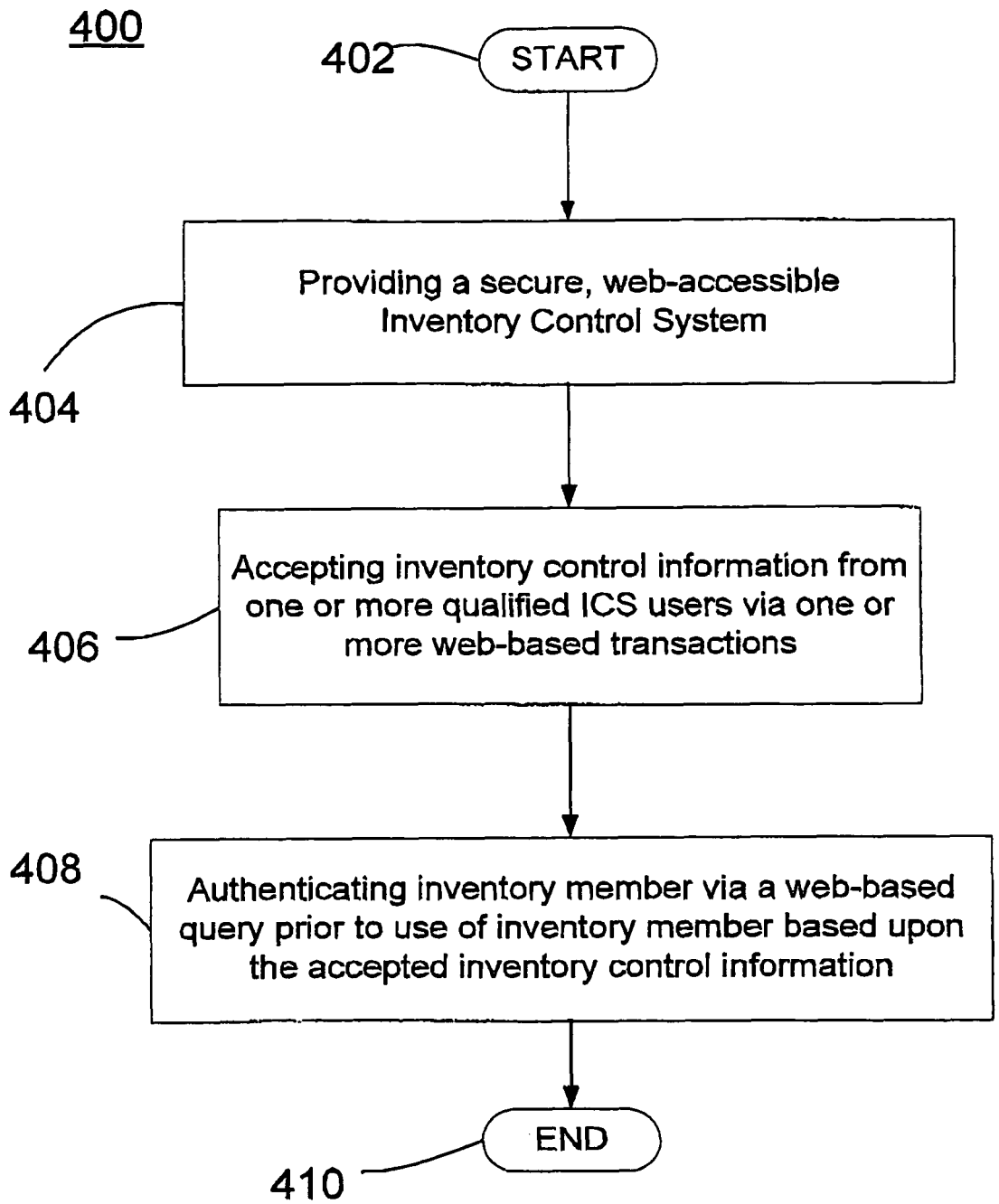
FIG. 4 depicts a series of method steps for practicing a second embodiment of an inventory control and device authentication operation in accordance with the subject invention.

FIG. 4 depicts a series of method steps 400 for practicing a second embodiment of the inventory control (security) and device authentication operation in accordance with the subject invention. Specifically, the method 400 starts at step 402 and proceeds to step 404 in which a secure, web-accessible inventory control system is provided. The inventory control system may be the ICS 108 as seen in FIG. 1 or any other such system capable of performing the described steps via interaction with a public access network such as, but not limited to, the Internet.

At step 406, inventory control information is accepted from one or more qualified inventory control systems users via one or more web-based transactions. Particularly, inventory control information, such as, but not limited to the files containing the identifiers described above, is accepted by the inventory control system from at least one selected from the group consisting of an inventory origination point to one or more sales distribution points, between two such distribution points and between one such distribution point and a point of sale location such as a retailer. Preferably, the information is accepted via web-based authentication process such as a user ID/password protocol after delivery of the inventory. Most preferably, the information is accepted within 24 hours after delivery of the inventory.

After step 406, the method proceeds to step 408 where members of the inventory (represented by the inventory control information) are authenticated via a web-based query. Particularly, inventory control information of at least one of the members of the inventory (i.e., devices 118) is compared to the accepted inventory management information occurs as a result of one selected from the group consisting of a registration/authentication query initiated by a end user and an authentication/security confirmation query initiated by an inventory manager. These queries preferably occur over the Internet or other type of network where end users and inventory managers can access the inventory control system. The method ends at step 410.

Figure 5:
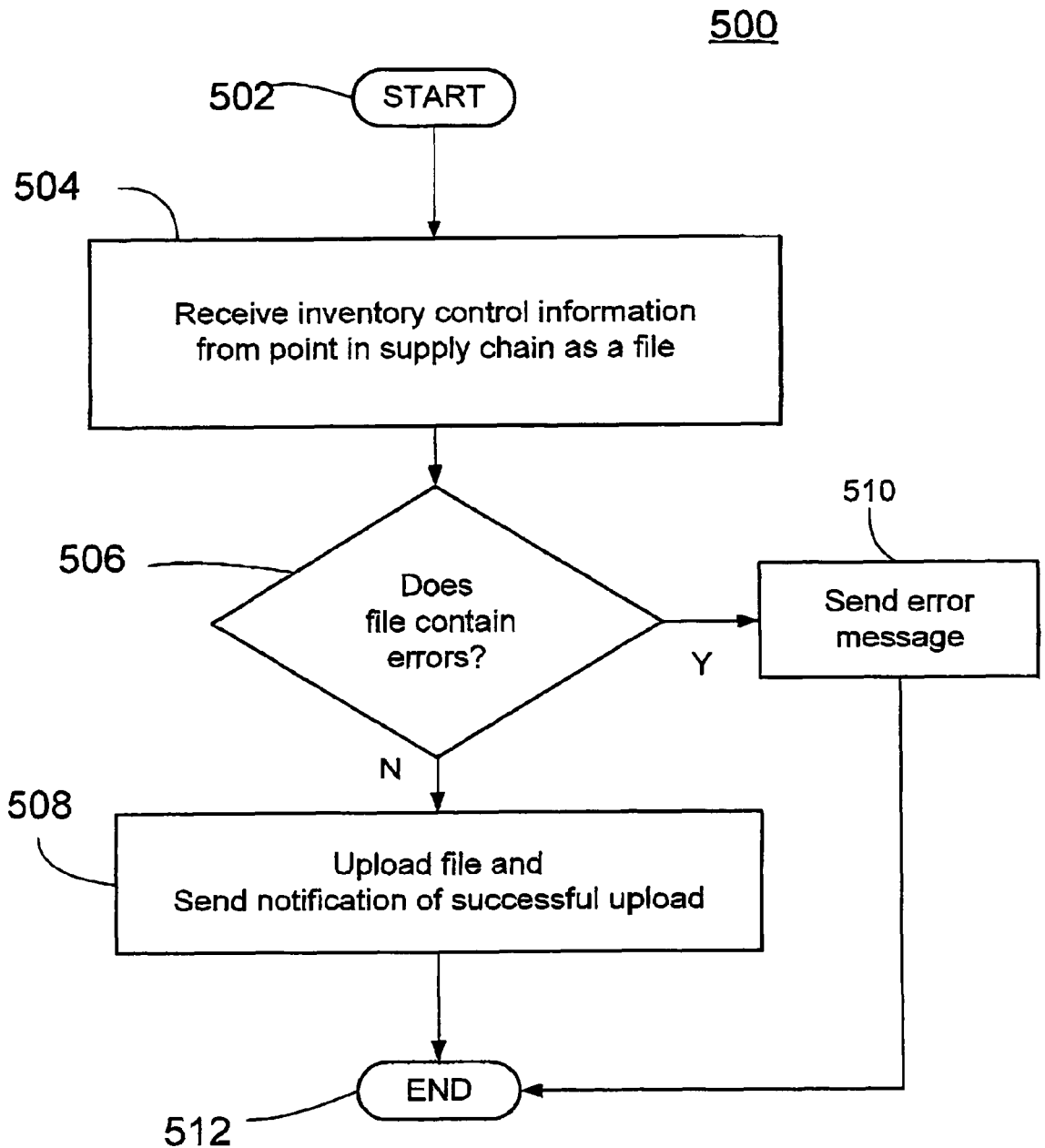
FIG. 5 depicts a series of method steps for practicing an error checking subrountine component of an inventory control and device authentication operation in accordance with the subject invention.

FIG. 5 depicts an error checking subroutine that is executed inside of each accepting step of the subject invention such as accepting steps 204, 206 and 406. That is, it is important that the inventory control information that is passed to the ICS 108 be of a specific format and content such that the database 104 can accept the information and proper update inventory records. As such, a series of method steps 500 is provided for accomplishing this task. Specifically, the method starts at step 502 and proceeds to step 504 where inventory control information is received from one of the aforementioned inventory information locations 110/116. Preferably, the inventory control information is provided as a comma separated value file, but other formats are possible and considered within the scope of the invention.

At step 506, a decision is made as to whether or not the information in the file contains errors. For example, should the formatting of the inventory control information or other similar error be found, the file cannot be accepted into the database for updating purposes. Accordingly, if the file is found to contain at least one error, the method proceeds to step 510 where an error message is sent to the entity attempting to send the file. In one embodiment of the invention, the error message is provided on a screen or other type of interface that the entity sending the file is using to access the ICS 108. If the file is rejected in this manner and the error message sent, the entity will have a time window in which to correct the erroneous file and resend the inventory control information in order to comply with inventory management requirements. In one embodiment of the invention, the time window is no more than six (6) hours from the time of the original upload attempt.

If the file does not contain any errors, the method proceeds to step 508 where the file is uploaded to the database 104. Upon successful uploading of the file, a confirmation message indicating such condition is sent to the entity attempting to send the file. In one embodiment of the invention, the confirmation message is provided on a screen or other type of interface that the entity sending the file is using to access the ICS 108. The method 500 ends at step 512.

While foregoing is directed to embodiments of the present invention, other and further embodiments of the invention may be devised without departing from the basic scope thereof, and the scope thereof.

The invention claimed is:

1. A method for automated inventory tracking and device authentication using device identity-containing information associated with at least one device that is part of an inventory, the method comprising:

accepting initial device identity-containing information indicative of movement of at least one device from an inventory origination point to a first sales distribution point;

accepting additional device identity-containing information indicative of movement of said at least one device from each instance of a new and successive sales distribution point as said at least one device moves through a supply chain;

comparing a device ID of said at least one device subsequently connected to an end user networking access point to said accepted initial and additional device identity-containing information; and authenticating said at least one device subsequently connected to an end user networking access point based upon said accepted initial and additional device identity-containing information.

2. The method of claim 1 wherein authenticating said at least one device is selected from the group consisting of successfully registering the device to access a service via the end user networking access point and confirming that the device is at a proper location in the supply chain.

3. The method of claim 2 wherein the service is a telecommunications service.

4. The method of claim 3 wherein the telecommunications service is a VoIP service.

5. The method of claim 2 wherein the confirming of the device is performed by an inventory control manager.

6. The method of claim 1 wherein authentication of said at least one device fails for reasons selected from the group consisting of a stolen device and a tampered device.

7. The method of claim 1 wherein authentication occurs if the device ID associated with said at least one device matches device identity-containing information provided through the supply chain movement.

8. The method of claim 1 wherein the accepting of said initial device identity-containing information occurs after delivery of an inventory from the origination point.

9. The method of claim 8 wherein the accepting of said initial device identity-containing information occurs within 24 hours after delivery of the inventory from the origination point.

10. The method of claim 1 wherein the accepting of said additional device identity-containing information occurs after delivery of an inventory from each instance of the new and successive sales distribution point.

11. The method of claim 10 wherein the accepting of said additional device identity-containing information occurs within 24 hours after delivery of the inventory from each instance of the new and successive sales distribution point.

12. The method of claim 1 wherein the device identity-containing information is selected from the group consisting of MAC address information and device serial number information.

13. A computer readable medium storing a software program that, when executed by a computer, causes the computer to perform an operation of automatically tracking inventory and performing device authentication using device identity-containing information associated with at least one device that is part of an inventory, the operation comprising:

accepting initial device identity-containing information indicative of movement of at least one device from an inventory origination point to a first sales distribution point;

accepting additional device identity-containing information indicative of movement of said at least one device from each instance of a new and successive sales distribution point as said at least one device moves through a supply chain;

comparing a device ID of said at least one device subsequently connected to an end user networking access point to said accepted initial and additional device identity-containing information; and authenticating said at least one device subsequently connected to an end user networking access point based upon said accepted initial and additional device identity-containing information.

14. The computer readable medium of claim 13 wherein authenticating of said at least one device is selected from the group consisting of successfully registering the device to access a service via the end user networking access point and confirming the device is at a proper location in the supply chain.

15. The computer readable medium of claim 14 wherein the service is a telecommunications service.

16. The computer readable medium of claim 15 wherein the telecommunications service is a VoIP service.

17. The computer readable medium of claim 14 wherein the confirming of the device is performed by an inventory control manager.

18. The computer readable medium of claim 13 wherein authentication of said at least one device fails for reasons selected from the group consisting of a stolen device and a tampered device.

19. The computer readable medium of claim 13 wherein authentication occurs if the device ID associated with said at least one device matches device identity-containing information provided through the supply chain movement.

20. The computer readable medium of claim 13 wherein the accepting of said initial device identity-containing information occurs after delivery of an inventory from the origination point.

21. The computer readable medium of claim 20 wherein the accepting of said initial device identity-containing information occurs within 24 hours after delivery of the inventory from the origination point.

22. The computer readable medium of claim 13 wherein the accepting of said additional device identity-containing information occurs after delivery of an inventory from each instance of the new and successive sales distribution point.

23. The computer readable medium of claim 22 wherein the accepting of said additional device identity-containing information occurs within 24 hours after delivery of the inventory from each instance of the new and successive sales distribution point.

24. The computer readable medium of claim 13 wherein the device identity-containing information is selected from the group consisting of MAC address information and device serial number information.

25. A system for tracking inventory and performing device authentication using device identity-containing information associated with at least one device that is part of an inventory, the system comprising:
- means for accepting initial device identity-containing information indicative of movement of at least one device from an inventory origination point to a first sales distribution point;
- means for accepting additional device identity-containing information indicative of movement of said at least one device from each instance of a new and successive sales distribution point as said at least one device moves through a supply chain;
- means for storing said initial and additional device identity-containing information; and
- means for authenticating said at least one device, subsequently connected to an end user networking access point, based upon said accepted initial and additional device identity-containing information.

* * * * *